(12) United States Patent
Cho et al.

(10) Patent No.: US 8,843,138 B2
(45) Date of Patent: Sep. 23, 2014

(54) METHOD FOR CONTROLLING TRANSMISSION POWER IN FEMTO BASE STATION AND APPARATUS THEREOF

(75) Inventors: Kyong Tak Cho, Daejeon-si (KR); Jun Sik Kim, Seoul (KR); Seung Que Lee, Daejeon-si (KR); Hyung Deug Bae, Daejeon-si (KR); Sang Chul Oh, Daejeon-si (KR); Nam Hoon Park, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 341 days.

(21) Appl. No.: 13/331,785

(22) Filed: Dec. 20, 2011

(65) Prior Publication Data
US 2012/0157154 A1 Jun. 21, 2012

(30) Foreign Application Priority Data
Dec. 20, 2010 (KR) .................. 10-2010-0130648

(51) Int. Cl.
H04B 1/00 (2006.01)
H04B 7/00 (2006.01)
H04W 36/00 (2009.01)
H04W 52/24 (2009.01)
H04W 52/14 (2009.01)

(52) U.S. Cl.
CPC .......... *H04W 52/244* (2013.01); *H04W 52/143* (2013.01)
USPC ............................. 455/444; 455/522; 455/69

(58) Field of Classification Search
CPC .................................... H04W 52/244
USPC ....................... 455/522, 69, 127.1
See application file for complete search history.

(56) References Cited

U.S. PATENT DOCUMENTS

| | | | | |
|---|---|---|---|---|
| 8,160,589 | B2 * | 4/2012 | Kuwahara | 455/440 |
| 2009/0042593 | A1 * | 2/2009 | Yavuz et al. | 455/522 |
| 2009/0253461 | A1 * | 10/2009 | Kuwahara | 455/561 |
| 2010/0234039 | A1 | 9/2010 | Kwon et al. | |
| 2011/0077041 | A1 * | 3/2011 | Kwon et al. | 455/509 |
| 2011/0217985 | A1 * | 9/2011 | Gorokhov | 455/452.2 |
| 2012/0093043 | A1 * | 4/2012 | Choi et al. | 370/280 |
| 2013/0143614 | A1 * | 6/2013 | Lee et al. | 455/509 |
| 2013/0183986 | A1 * | 7/2013 | Park et al. | 455/446 |
| 2013/0260805 | A1 * | 10/2013 | Park et al. | 455/501 |
| 2013/0308473 | A1 * | 11/2013 | Sun et al. | 370/252 |

FOREIGN PATENT DOCUMENTS

| | | |
|---|---|---|
| KR | 1020090120939 | 11/2009 |
| KR | 1020100051855 | 5/2010 |

\* cited by examiner

*Primary Examiner* — Tilahun B Gesesse
(74) *Attorney, Agent, or Firm* — Nelson Mullins Riley & Scarborough LLP

(57) ABSTRACT

A method and an apparatus for controlling transmission power in a femto base station is provided. The method includes: predicting femto base station interference to be given from an adjacent femto base station to a terminal; predicting macro base station interference to be given from a macro base station to the terminal; determining transmission power for the terminal; and transmitting a downlink signal to the terminal on the basis of the transmission power, wherein the femto base station interference is predicted on the basis of a distance between serving femto base station and the adjacent femto base station and the transmission power of the adjacent femto base station, and the macro base station interference is predicted on the basis of a distance between serving femto base station and the macro base station and the transmission power of the macro base station.

8 Claims, 6 Drawing Sheets

METHOD FOR CONTROLLING TRANSMISSION POWER IN FEMTO BASE STATION AND APPARATUS THEREOF

CROSS-REFERENCE TO RELATED APPLICATIONS

This application claims the benefit of priority of Korean Patent Application No. 10-2010-0130648 filed on Dec. 20, 2010, which is incorporated by reference in their entirety herein.

BACKGROUND OF THE INVENTION

1. Field of the Invention

The present invention provides wireless communications, and more particularly, a method for controlling transmission power in a femto base station and an apparatus thereof.

2. Related Art

In a mobile communication system, a femto-cell service has been proposed for the purpose of extending coverage of a base station, enhancing communication quality, providing various communication services, etc. In general, a femto cell refers to a small base station installed at home (hereinafter, referred to as a femto base station) or a service area of the femto base station. A geographical service area of the femto cell has a transmission range of 10 m to 20 m with respect to the femto base station. Such a femto cell service has advantages of low cost of the femto base station, a user's direct and convenient installation of the femto base station, low transmission power, etc. The femto base station can provide a mobile communication service as being connected to a backhaul based on Internet, such as a digital subscriber loop (DSL), a cable modem, etc.

Generally, the femto base station is installed within a service area of a previously installed macro base station. The macro base station is a base station generally installed by a mobile communication service provider, which has a wider service area than the femto base station and is installed in a fixed point. If the femto base station and the macro base station use one channel in a downlink, a downlink signal of a newly installed femto base station is seriously interfered with a downlink signal of a previously installed macro base station. That is, the downlink signal of the newly installed femto base station interferes with a terminal communicating with the macro base station, thereby deteriorating service quality of the whole macro base station. To solve these problems, the related arts have to proposed methods for lowering downlink transmission power of the femto base station. However, if the downlink transmission power of the femto base station is excessively lowered, the service quality may also be deteriorated in terminals of the femto base station.

Further, in the related arts, information exchange of great complexity was needed between the terminal and the femto base station or between the femto base station and the macro base station in determining the transmission power of the femto base station.

SUMMARY OF THE INVENTION

The present invention provides a method for controlling transmission power in a femto base station, which can transmit a downlink signal that provides high reception to a terminal serviced by the femto base station while minimizing interference with a downlink signal of a macro base station, and a femto base station using the same.

In an aspect, a method for controlling transmission power in a serving femto base station, the method including: predicting femto base station interference to be given from an adjacent femto base station to a terminal; predicting macro base station interference to be given from a macro base station to the terminal; determining transmission power for the terminal; and transmitting a downlink signal to the terminal on the basis of the transmission power, wherein the femto base station interference is predicted on the basis of a distance between the serving femto base station and the adjacent femto base station and the transmission power of the adjacent femto base station, and the macro base station interference is predicted on the basis of a distance between the serving femto base station and the macro base station and the transmission power of the macro base station.

The method may further include transmitting a reference signal to the terminal; and receiving feedback of a receiving power value for the reference signal from the terminal.

If a plurality of terminals are serviced by the serving femto base station, the transmission power may be determined to be in proportion to the femto base station interference and the macro base station interference, and to be in inverse proportion to a minimum value of receiving power fed back from the plurality of terminals.

If the serving femto base station is located in a room, the femto base station interference may be set to a predetermined value.

If there are a plurality of adjacent femto base station, the femto base station interference may be obtained by adding up respective interferences with the plurality of adjacent femto base stations.

In another aspect, a serving femto base station including: an interference predictor which predicts femto base station interference to be given from an adjacent femto base station to a terminal and macro base station interference to be given from a macro base station to the terminal; a power controller which determines transmission power of a downlink signal on the basis of the femto base station interference and the macro base station interference; a processor which controls the interference predictor and the power controller; and a transmitter which transmits a downlink signal based on the transmission power, in which the interference predictor predicts the femto base station interference on the basis of a distance between the serving femto base station and the adjacent femto base station and the transmission power of the adjacent femto base station, and the macro base station interference on the basis of a distance between the serving femto base station and the macro base station and the transmission power of the macro base station, and the power controller determining the transmission power on the basis of the femto base station interference and the macro base station interference.

The processor may transmit a reference signal to the terminal through the transmitter, and receive a receiving power value for the reference signal from the terminal through the receiver.

The transmission power may be determined to be in proportion to the femto base station interference and the macro base station interference, and to be in inverse proportion to a minimum value of receiving power received from the plurality of terminals.

If the serving femto base station is located in a room, the femto base station interference is set to a predetermined value.

The femto base station interference may be obtained by adding up respective interferences with the plurality of adjacent femto base stations.

DESCRIPTION OF EXEMPLARY EMBODIMENTS

Figure 1:
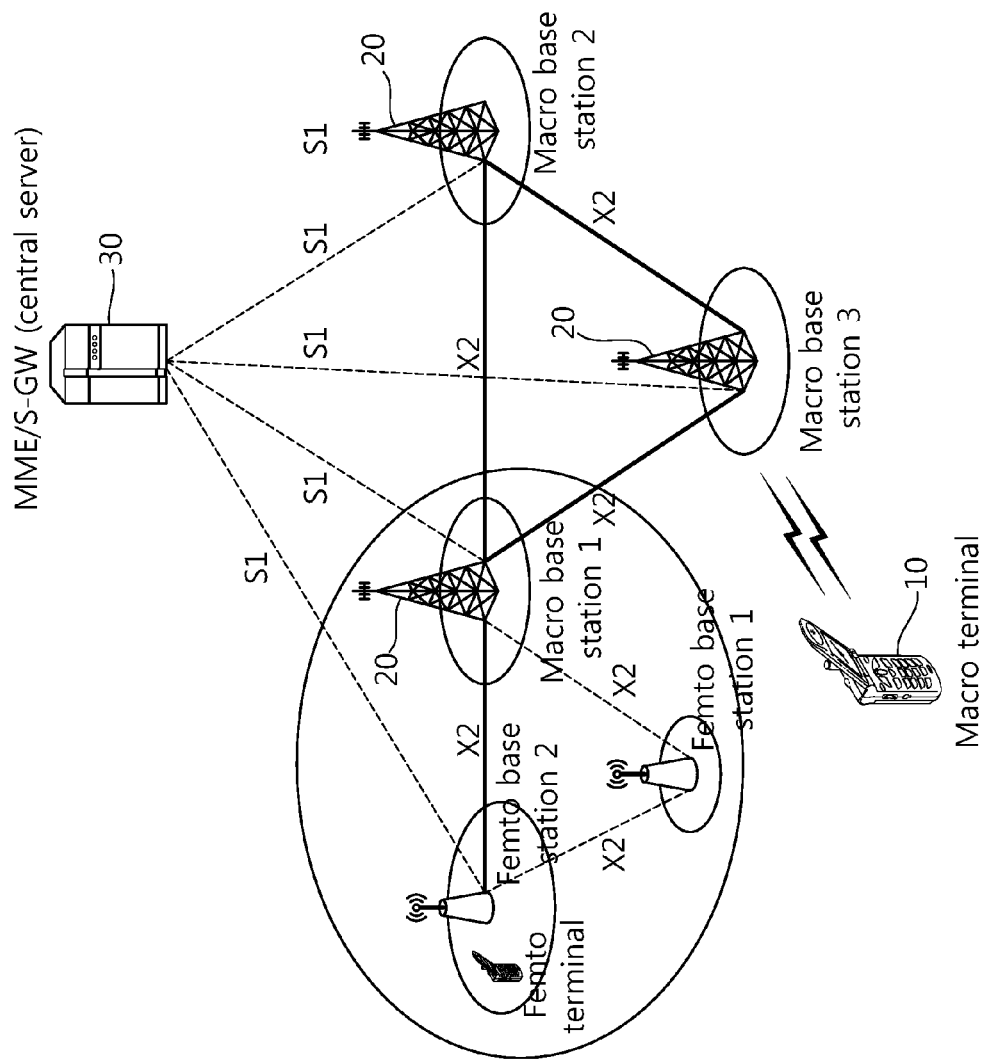
FIG. 1 shows an example of a wireless communication system including a plurality of femto base stations and macro base stations.

FIG. 1 shows an example of a wireless communication system including a to plurality of femto base stations and macro base stations.

Referring to FIG. 1, the wireless communication system may include a macro base station 20 and a femto base station. The macro base station 20 is a device that communicates with a femto base station or terminal, which is generally installed in a fixed point. The macro base station may be called other terms such as an evolved-node B (eNB), a base transceiver system (BTS), an access point, etc. The term 'macro cell' refers to the macro base station itself or an area where the macro base station can provide a service. Hereinafter, for convenience, the term 'macro cell' will be used to mean an area where the macro base station can provide a service.

The femto base station is a device that communicates with the macro base station or terminal. Typically, the femto base station is a small base station installed in a room, but may be installed outside a room. The femto base station has a service range (transmission range) of 10 m to 20 m by way of example, but not limited thereto. The femto base station has features of low cost, convenient installation, low transmission power, etc. The femto base station is connected to a backhaul based on Internet through a digital subscriber loop (DSL), a cable modem, etc., and provides a mobile communication service to a terminal. The term 'femto cell' refers to an area where the femto base station can provide a service or the femto base station itself, but it will be used for convenience to mean an area where the femto base station con provide a service. A plurality of femto cells may be provided in one macro cell, and the number of femto cells may be varied as time goes by. For example, if a user installs the femto base station at home, the number of femto cells in the macro cell increases.

An interface for user traffic or control traffic transmission may be used between the macro base station and the femto base station. For example, the macro base station and the femto base station or the femto base stations may be connected to each other through an S1 interface or an X2 interface. The macro base station and the femto base station may be connected to an evolved packet core (EPC) through the S1 interface, more particularly, a mobility management entity (MME) through S1-MME and a serving gateway (S-GW) through S1-U. Below, a device comprehensively involving the MME/S-GW will be called a central server 30 for convenience. The S1 interface may support many-to-many-relation between the central server and the macro and femto base stations.

A terminal may be stationary or mobile, which may be called other terms such as a mobile station (MS), a user terminal (UT), a subscriber station (SS), a mobile terminal (MT), a wireless device, a user equipment (UE), etc. Hereinafter, the terminal serviced by the macro base station will be called a macro terminal, and the terminal serviced by the femto base station will be called a femto terminal for convenience. Also, a downlink refers to communication from the base station (i.e., the macro base station or the femto base station) to the terminal (i.e., the macro terminal, the femto terminal), and an uplink refers to communication from the terminal to the base station.

Each of the macro base station and the femto base station stores location information registered at initial installation of the base station, and the central server 30 may store the location information of each base station.

Figure 2:
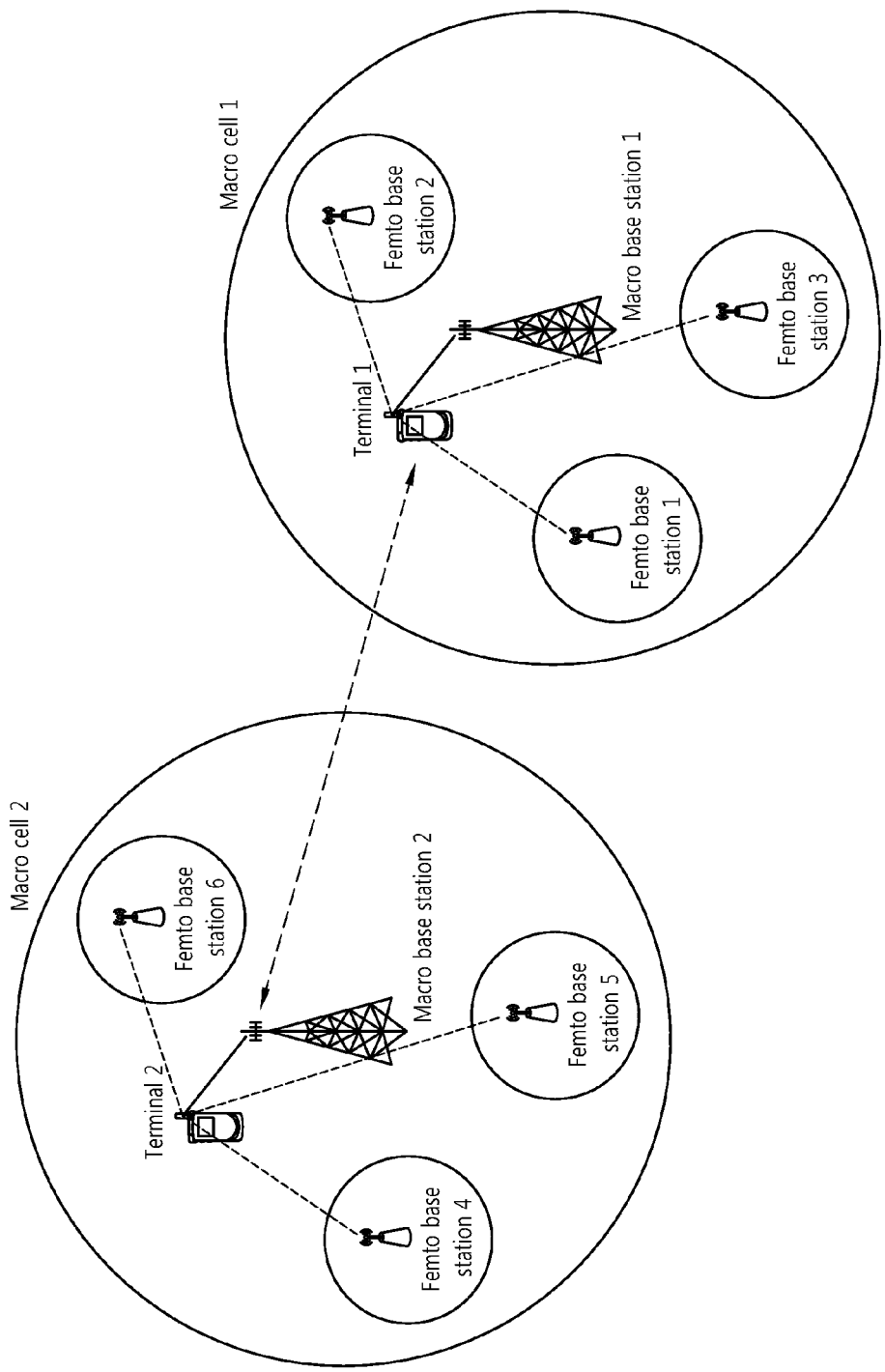
FIG. 2 illustrates that a femto base station interferes with a macro terminal in a downlink.

FIG. 2 illustrates that a femto base station interferes with a macro terminal in a downlink.

Referring to FIG. 2, there may be a plurality of femto base stations, e.g., femto base stations #1, #2 and #3 within a macro cell #1 serviced by a macro base station #1. In this case, a terminal #1 (macro terminal #1) serviced by the macro base station #1 may be interfered with a downlink signal transmitted by the femto base stations #1, #2 and #3 because of wireless communication's own characteristics. In other words, the downlink signals transmitted by the femto base stations #1, #2 and #3 may interfere with the to terminal #1. The interference due to the downlink signal of the femto base station causes the macro terminal to be deteriorated in downlink performance and lowers communication quality.

Also, the downlink signal transmitted by an adjacent macro base station such as a macro base station #2 may interfere with the macro terminal #1. If a macro cell serviced by the macro base station #2 is called a macro cell #2, the macro terminal #1 may be located in a boundary of the macro cell #1 and the macro cell #2. In this case, the downlink signal of the macro base station #2 may interfere with the macro terminal #1.

Thus, the macro base station or the femto base station controls transmission power for the downlink signal in consideration of interference with the terminal to be serviced. For example, a conventional method for predicting interference with the terminal predicts the interference with the terminal after grasping the location of the terminal on the basis of a global positioning system (GPS), or requests complex signal exchange between the terminal and the base station. Such a conventional method needs signal exchange of great complexity between the base station and the terminal, and therefore great complexity arises in power control.

Also, there is a conventional method for lowering downlink transmission power of the femto base station in order to reduce interference between the downlink signal of the femto base station and the macro terminal. For example, such a method may be achieved by a method that the macro base station controls the downlink transmission power of the femto base station. However, this method also needs signal exchange of great complexity between the macro base station and the femto base station, and deteriorates service quality of the femto terminal if the downlink transmission power of the femto base station is excessively lowered.

Accordingly, there is required a method that the femto base station independently controls transmission power regardless of the macro base station while lowering the complexity requested for the femto base station.

First, a schematic outline of a transmission power control method in the femto base station will be given, and then each process of the method will be described in more detail.

Figure 3:
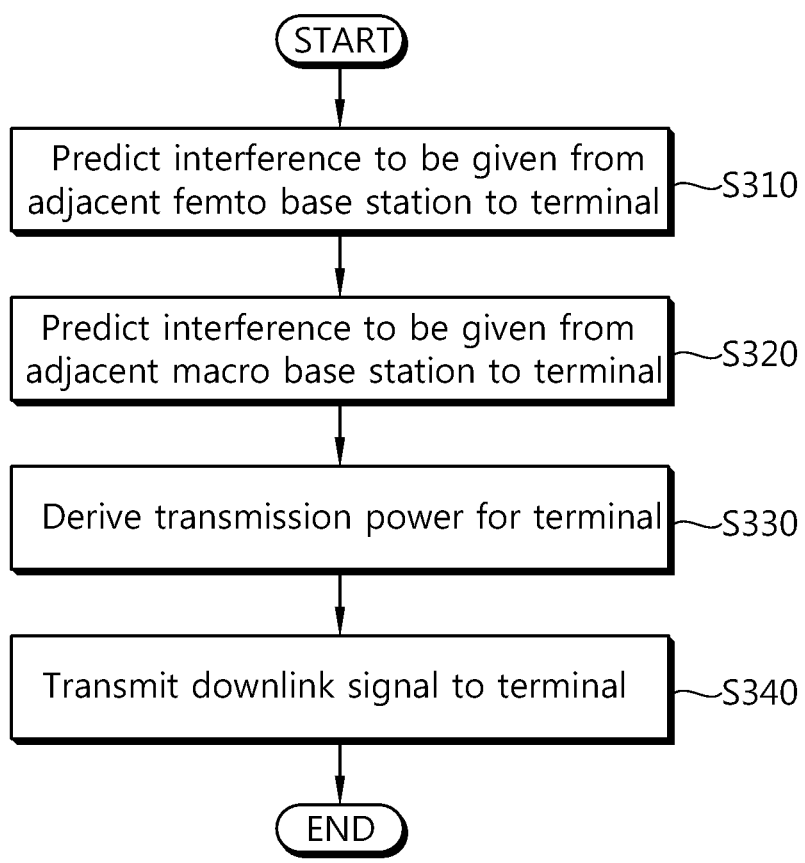
FIG. 3 shows a schematic outline of a method for controlling transmission power in a femto base station according to an exemplary embodiment of the present invention.

FIG. 3 shows a schematic outline of a method for controlling transmission power in a femto base station according to an exemplary embodiment of the present invention.

Referring to FIG. 3, the femto base station predicts interference to be given from an adjacent femto base station to a femto terminal (S310).

The femto base station predicts interference to be given from an adjacent macro base station to a femto terminal (S320).

The femto base station drives transmission power for the femto terminal (S330), and then transmits a downlink signal to the femto terminal (S340).

Below, each process will be described in more detail.

Figure 4:
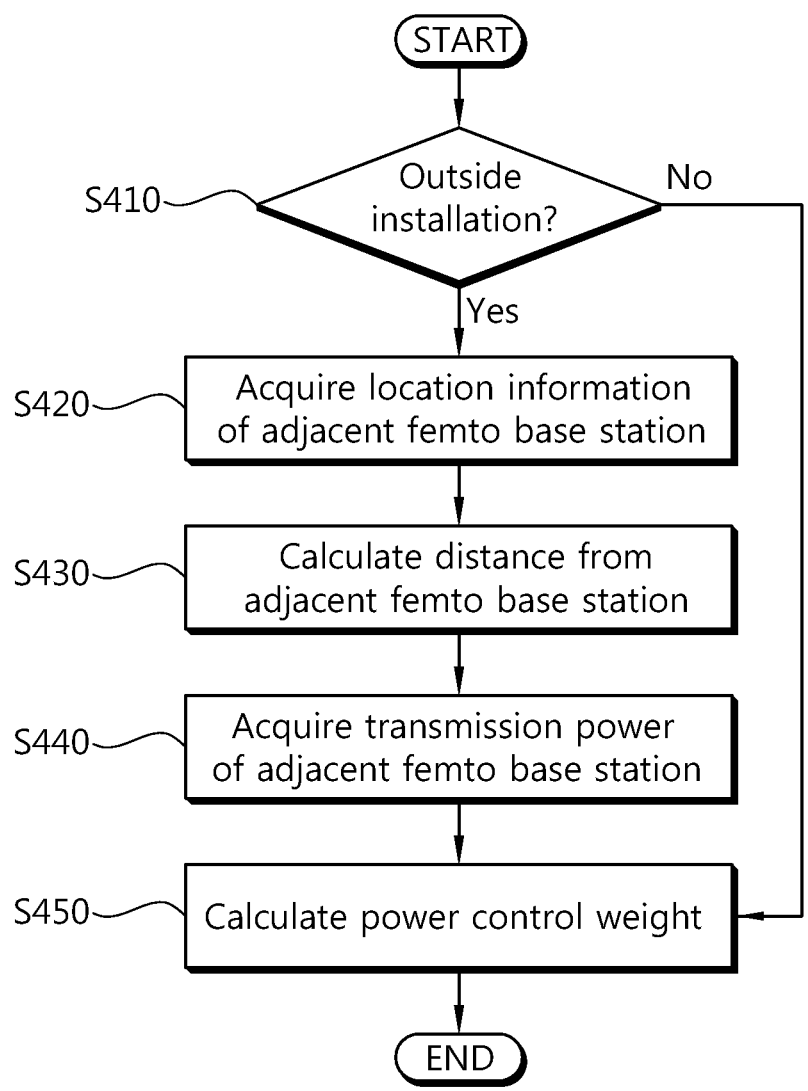
FIG. 4 illustrates a process that a serving femto base station predicts interference to be given from an adjacent femto base station to a femto terminal.

FIG. 4 illustrates a process that a serving femto base station predicts interference to be given from an adjacent femto base station to a femto terminal.

Referring to FIG. 4, the serving femto base station (hereinafter, referred to as a 'femto base station') determines whether it is currently installed in or outside a room (S410). The femto base station can perform this determination through various methods. For example, such information may be set up when installing the femto base station, or the determination may be based on its own location information received from the central server.

If it is determined that the femto base station is installed outside a room, the femto base station acquires location information of an adjacent femto base station (S420). For example, the femto base station may acquire the location information of the adjacent femto base station from the central server through the S1 interface. Alternatively, the femto base station may acquire the location information from the adjacent femto base station through the X2 interface.

The femto base station calculates a distance from the adjacent femto base station on the basis of the location information (S430). That is, the femto base station calculates the distance on the basis of its own location information and the location information of the adjacent femto base station.

Also, the femto base station acquires a transmission power level of the adjacent femto base station (S440). The transmission power level may be acquired from the central server through the S1 interface, or directly acquired from the adjacent femto base station through the X2 interface.

The femto base station predicts interference to be given to the femto terminal on the basis of the distance from the adjacent femto base station and the transmission power of the adjacent femto base station, and calculates a power control weight to be used in determining the transmission power level in consideration of the predicted interference (S450). The power control weight is a parameter used for determining the transmission power of when the femto base station transmits a downlink signal to the femto terminal.

If the adjacent femto base station is installed in a room, it is determined that the interference due to the adjacent femto base station is ignorable, and thus the power control weight may be set to a preset certain value, e.g. '0'.

The serving femto base station providing a service to the femto terminal determines the transmission power in consideration of interference to be given from the adjacent femto base station to the femto terminal. A theoretical matter to be considered when controlling the power of the femto base station is a practical interference level to be given to the femto terminal. However, the femto base station needs a lot of information exchange to calculate a practical interference level to be given to the femto terminal. Therefore, the interference level to be applied to the femto terminal is predicted by calculating the interference of when the femto terminal is located in the femto base station, thereby decreasing complexity. In FIG. 4, the process of acquiring the location information of the adjacent femto base station is separated from the process of acquiring the transmission power level, but not limited thereto. Alternatively, the location information and transmission power level of the adjacent femto base station may be acquired in one signaling process.

Figure 5:
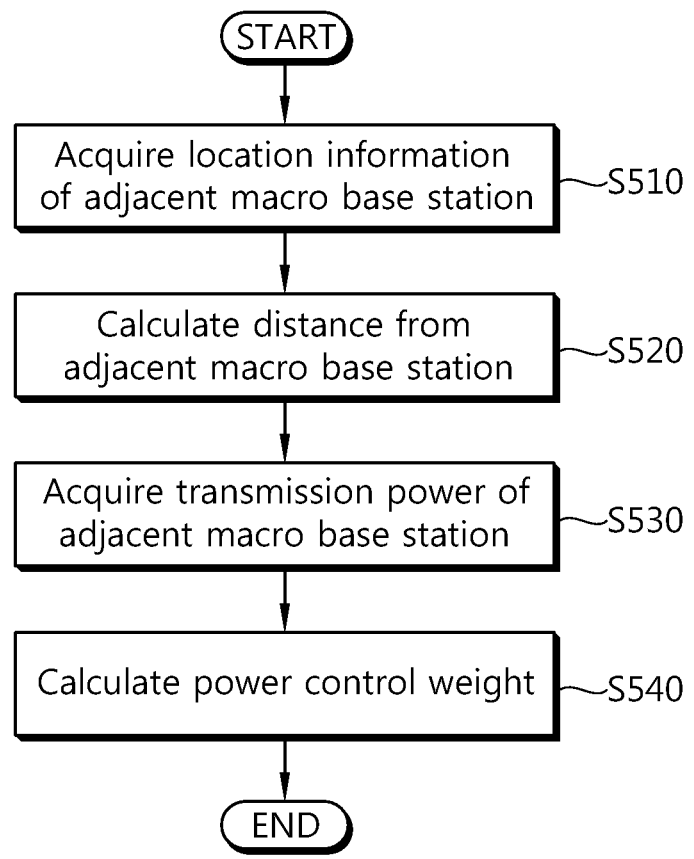
FIG. 5 illustrates a process that a femto base station predicts interference to be given from a macro base station to a femto terminal.

FIG. 5 illustrates a process that a femto base station predicts interference to be given from a macro base station to a femto terminal.

Referring to FIG. 5, the femto base station acquires the location information of the macro base station (S510). That is, the femto base station acquires the location information of the macro base station of the macro cell to which the femto base station belongs, the macro base station of the adjacent macro cell, etc. Such location information may be acquired from the central server, or directly acquired from the macro base station.

The femto base station calculates a distance from the macro base station (S520). The femto base station can calculate the distance from the macro base station on the basis of its own location information and the location information of the macro base station.

The femto base station acquires the transmission power level of the macro base station (S530). The transmission power level may be acquired from the central server through the S1 interface, or directly acquired from the macro base station through the X2 interface.

The femto base station calculates a power control weight on the basis of the distance from the macro base station and the transmission power level (S540). The power control weight is a parameter used for determining the transmission power of when the femto base station transmits a downlink signal to the femto terminal.

The femto base station determines the transmission power level on the basis of the power control weight derived from the processes described with reference to FIGS. 4 and 5. Below, a mathematical background of the processes explained with reference to FIGS. 4 and 5 will be described.

Path loss between the femto base station and the adjacent femto base station can be calculated by the following expression.

$$L_H^i(r)[dB] = 38.46 + 20 \log_{10} r$$

$$L_H^o(r)[dB] = \max(L_M^o(r), L_H^i(r)) + L_{ow}$$

$$L_H^d(r)[dB] = \max(L_M^o(r), L_H^i(r)) + 2L_{ow} \qquad \text{[Expression 1]}$$

Where, r is a distance between the femto base stations, and $L_{ow}$ is loss generated when a signal passes through a wall of a building, which is generally 10 to 20 dB. The first equation of the expression 1 shows a case where the femto base station and the adjacent femto base station are all located outside a room; the second equation shows a case where the femto base station is located in the room but the adjacent femto base station is outside the room; and the third equation shows a case where the femto base station and the adjacent femto base station are all located in the room (i.e., of a different building).

$L_M^i(r)$ shows the pass loss between the macro base station and the femto base station when the femto base station is located in the room, and $L_M^o(r)$ shows the pass loss between the macro base station and the femto base station when the femto base station is located outside the room. $L_M^i(r)$ and $L_M^o(r)$ can be calculated by the following expression.

$$L_M^i(r)[dB] = 15.3 + 37.6 \log_{10} r + L_{ow},$$

$$L_M^o(r)[dB] = 15.3 + 37.6 \log_{10} r \qquad \text{[Expression 2]}$$

Path gain can be obtained from the above expressions 1 and 2 about the path loss. The path gain can be calculated by the following expression.

$$G_M^{(\circ)}(r) = 10^{-LM^{(\circ)}(r)/10},$$

$$G_H^{(\circ)}(r) = 10^{-LH^{(\circ)}(r)/10} \quad \text{[Expression 3]}$$

On the basis of the path gain, the interference level to be given from the macro base station to the femto terminal can be represented as follows.

$$P_M G_M(d^j_M) \quad \text{[Expression 4]}$$

where, $P_M$ is the transmission power transmitted by the macro base station, and $d^j_M$ is the distance between the femto terminal and the macro base station.

Also, the interference level to be given from the adjacent femto base station to the femto terminal can be represented by the following expression.

$$P_{Hl} G_{Hl}(d^j_{Hl}) \quad \text{[Expression 5]}$$

Where, $P_{Hl}$ indicates the transmission power transmitted by the adjacent femto base station #1, and $d^j_{Hl}$ indicates the distance between the femto terminal and the adjacent femto base station #1.

However, it is difficult to precisely measure $d^j_M$ and $d^j_{Hl}$ in the foregoing expressions 4 and 5. Therefore, according to this exemplary embodiment, $d^j_M$ of the expression 4 is replaced by the distance between the femto base station and the macro base station, and $d^j_{Hl}$ of the expression 5 is replaced by the distance between the femto base station and the adjacent femto base station.

After respectively replacing $d^j_M$ and $d^j_{Hl}$ in the expressions 4 and 5 by the distance between the femto base station and the macro base station and the distance between the femto base station and the adjacent femto base station, the transmission power of the femto base station can be determined on the basis of the predicted interference with the femto terminal as follows.

$$P = \alpha \frac{\sum I_M + \sum I_F}{RSRP_{min}} \quad \text{[Expression 6]}$$

Where, $I_M$ indicates interference to be given to the femto terminal (from the macro base station) calculated after replacing $d^j_M$ of the expression 4 with the distance between the femto base station and the adjacent macro base station, and $I_F$ indicates interference to be given to the femto terminal (from the adjacent femto base station) calculated after replacing $d^j_{Hl}$ of the expression 5 with the distance between the femto base station and the adjacent femto base station. That is, the sum of $I_M$ and the sum of $I_F$ in the expression 6 correspond to the power control weights of FIGS. 4 and 5, respectively. A reference signal receiving power minimum value ($RSRP_{min}$) refers to the minimum value of reference signal receiving power received in each of the plural femto terminals. The RSRP corresponds to a power control subtractive value.

Also, α in the expression 6 is a proportional constant, which can be calculated as follows.

$$\Gamma_{HUE} P_{ref} \quad \text{[Expression 7]}$$

Where, $\Gamma_{HUE}$ is the minimum signal to interference-plus-noise ratio (SINR) required by the femto terminal, and $P_{ref}$ is reference signal transmission power level of the femto base station for controlling the transmission power.

Figure 6:
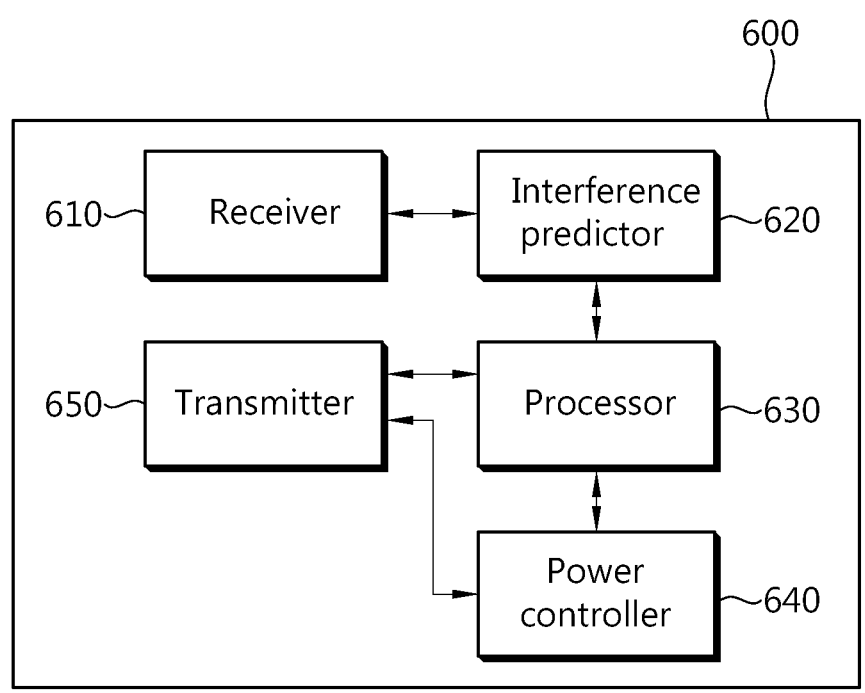
FIG. 6 shows a femto base station according to an exemplary embodiment of the present invention.

FIG. 6 shows a femto base station according to an exemplary embodiment of the present invention.

Referring to FIG. 6, the femto base station 600 includes a receiver 610, an interference predictor 620, a processor 630, a power controller 640, and a transmitter 650.

The receiver 610 is a module for receiving a wireless signal or a wired signal, which may include an antenna for the wireless signal, and a receiving circuit module for the wired signal.

The interference predictor 620 predicts the interference to be given from the adjacent femto base station or the macro terminal to the femto terminal on the assumption that the location of the femto terminal is equal to that of the femto base station. The interference predictor 620 predicts the interference to be given from the adjacent femto base station to the femto terminal (for convenience, it may be called femto base station interference) on the basis of the distance between the femto base station and the adjacent femto base station and the transmission power level of the adjacent femto base station. Also, the interference predictor 620 predicts the interference to be given from the macro base station to the femto terminal (for convenience, it may be called macro base station interference) on the basis of the distance between the femto base station and the macro base station and the transmission power level of the macro base station. Such a prediction method has already described above.

The processor 630 is a module for controlling operation of the femto base station, which is connected to the interference predictor 620, the power controller 640, etc. and controls the operation of each module.

The power controller 640 is a module for determining the transmission power when the femto base station transmits a downlink signal. The transmission power is determined on the basis of the femto base station interference and the macro base station interference.

The transmitter 650 is a module for transmitting a wireless signal. The transmitter 650 may include a power amplifier. The transmitter 650 may transmit a signal based on the transmission power determined depending on a power control signal.

As described above, the interference level to be given from the adjacent femto base station or the macro base station to the femto terminal serviced by the femto base station is obtained by only signaling between the base stations. According to an exemplary embodiment of the present invention, it is possible to predict an practical value approximately similar to the interference level to be given to the femto terminal, and complexity in obtaining the interference level is significantly lowered. Consequently, the femto base station can efficiently control transmission power while lowering the complexity.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for controlling transmission power in a serving femto base station, wherein the method is performed by the serving femto station, the method comprising:
  predicting femto base station interference to be given from an adjacent femto base station to a terminal;

predicting macro base station interference to be given from a macro base station to the terminal;

determining transmission power for the terminal; and transmitting a downlink signal to the terminal on the basis of the transmission power, wherein the femto base station interference is predicted on the basis of a distance between the serving femto base station and the adjacent femto base station and the transmission power of the adjacent femto base station, and the macro base station interference is predicted on the basis of a distance between the serving femto base station and the macro base station and the transmission power of the macro base station, wherein, if a plurality of terminals are serviced by the serving femto base station, the transmission power is determined to be increased as the femto base station interference and the macro base station interference increase, and the transmission power is determined to be decreased as a minimum value of receiving power fed back from the plurality of terminals increases.

2. The method of claim 1, further comprising transmitting a reference signal to the terminal; and receiving feedback of a receiving power value for the reference signal from the terminal.

3. The method of claim 1, wherein, if the serving femto base station is located in a room, the femto base station interference is set to a predetermined value.

4. The method of claim 1, wherein if there are a plurality of adjacent femto base station, the femto base station interference is obtained by adding up respective interferences with the plurality of adjacent femto base stations.

5. A serving femto base station comprising:

an interference predictor which predicts femto base station interference to be given from an adjacent femto base station to a terminal and macro base station interference to be given from a macro base station to the terminal;

a power controller which determines transmission power of a downlink signal on the basis of the femto base station interference and the macro base station interference;

a processor which controls the interference predictor and the power controller; and a transmitter which transmits a downlink signal based on the transmission power, wherein the interference predictor predicts the femto base station interference on the basis of a distance between the serving femto base station and the adjacent femto base station and the transmission power of the adjacent femto base station, and the macro base station interference on the basis of a distance between the serving femto base station and the macro base station and the transmission power of the macro base station, and the power controller determining the transmission power on the basis of the femto base station interference and the macro base station interference, wherein, if a plurality of terminals are serviced by the serving femto base station, the transmission power is determined to be increased as the femto base station interference and the macro base station interference increase, and the transmission power is determined to be decreased as a minimum value of receiving power fed back from the plurality of terminals increases.

6. The serving femto base station of claim 5, wherein the processor transmits a reference signal to the terminal through the transmitter, and receives a receiving power value for the reference signal from the terminal through the receiver.

7. The serving femto base station of claim 5, wherein, if the serving femto base station is located in a room, the femto base station interference is set to a predetermined value.

8. The serving femto base station of claim 5, wherein the femto base station interference is obtained by adding up respective interferences with the plurality of adjacent femto base stations.

* * * * *